Patented Mar. 31, 1931

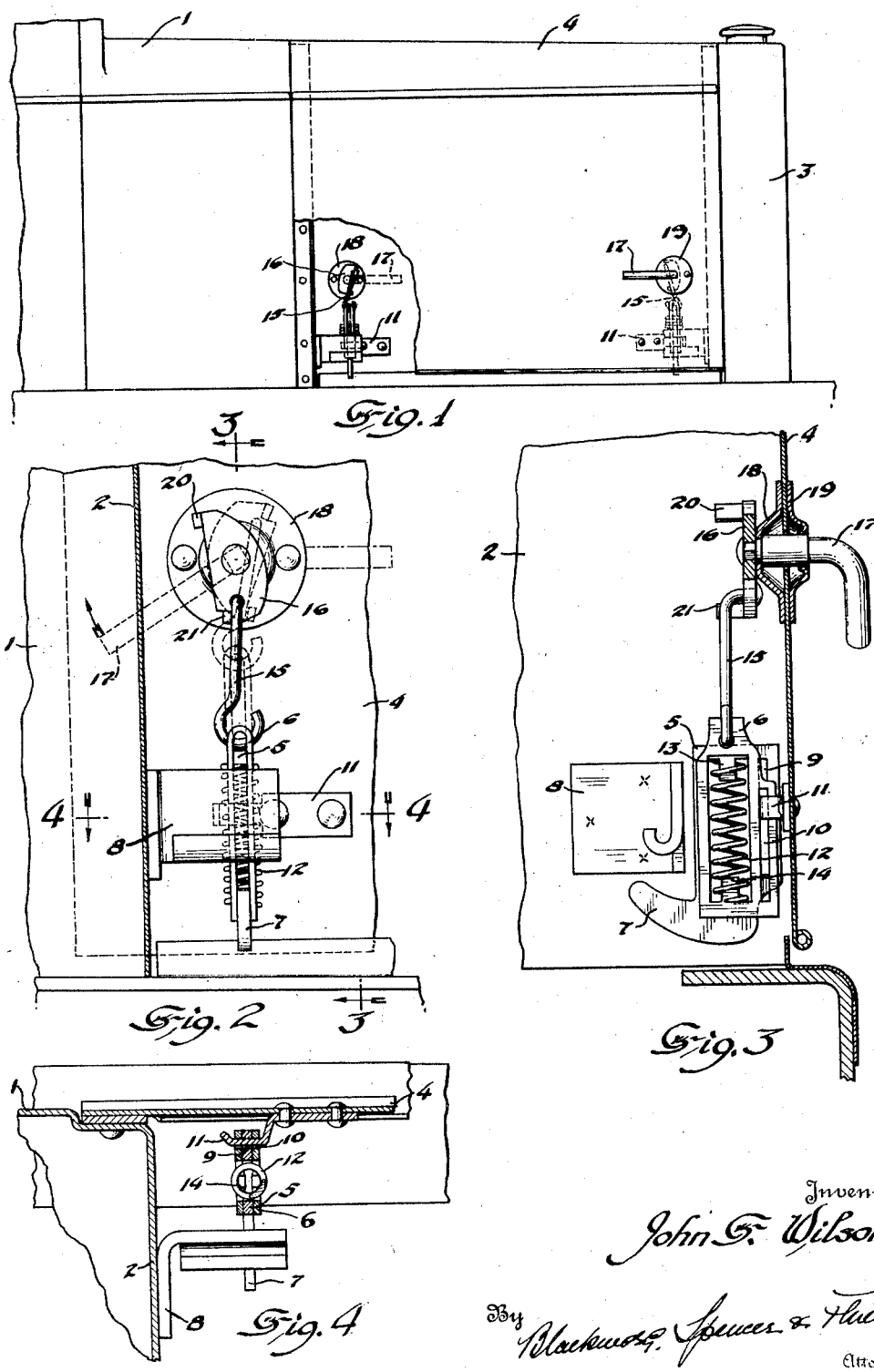

1,798,921

UNITED STATES PATENT OFFICE

JOHN F. WILSON, OF ROYAL OAK, MICHIGAN, ASSIGNOR TO GENERAL MOTORS CORPORATION, OF DETROIT, MICHIGAN, A CORPORATION OF DELAWARE

HOOD CATCH

Application filed July 9, 1928. Serial No. 291,311.

This invention relates to motor vehicles and more particularly to catches or fasteners for securely holding the engine bonnet or hood in place.

It is one of the objects of the present invention to provide a device that will be simple and economical in manufacture, efficient and positive in action, easy and convenient to operate and unlikely to get out of order.

A further object of the invention is to provide mechanism that may be placed beneath or inside the hood so as to be concealed from view, thus eliminating unsightly fittings and affording a more pleasing appearance to the vehicle.

Another object is to provide an improved fastening that may be located closely adjacent the ends of the hood panels for detachable engagement with brackets on the radiator and dash, the position of which parts remains the same regardless of the stress or twist to which the vehicle is subjected, whereby the hood is held more rigidly in place than it would be if fastened down to the chassis frame as is customary practice.

A further object is to provide a hood catch embodying a spring under compression to exert a positive locking pressure under all conditions.

A still further object of the invention is to provide a fastening that will insure a nicety in the fitting of the hood and maintain a tight contact with the customary cushioning or anti-squeak webbing on the radiator and dash.

Other objects and advantages will be apparent from the following detailed specification taken with the accompanying drawing showing a preferred embodiment of the invention, and wherein: Fig. 1 is a view of the front portion of a motor vehicle, with parts broken away, illustrating the application of the present invention; Fig. 2 is a fragmentary view of the locking mechanism on the inside of the hood; Fig. 3 is a view taken on line 3—3 of Fig. 2, and Fig. 4 is a sectional view taken on line 4—4 of Fig. 2.

Referring to the accompanying drawing the numeral 1 indicates the cowl of the vehicle body with which is associated a dash 2, and 3 the radiator forming a part of the engine cooling system. A bonnet or hood 4, comprising a set of hinged panels, extends between the dash and radiator and is held in place by means of the fasteners forming the present subject matter.

A pair of fasteners is provided for each side panel of the hood, the respective fasteners being located closely adjacent the ends of the side panels. The catch mechanism comprises a pair of telescopic members 5 and 6, the member 6 being of U shape; between the depending fingers of which is located the member 5; the member 5 being provided with a hooked portion 7 which is adapted to engage with a bracket 8, fastened to the dash 2 or to the radiator 3, as the case may be. The members 5 and 6 are provided with alined elongated slots 9 and 10 respectively in corresponding portions thereof, into which slots extends a finger or keeper 11, riveted or otherwise fastened to the side panel of the hood. The members 5 and 6 are also provided with alined openings in which is located a coil spring 12, the member 5 having a dependent tongue 13 extending into the coil and the member 6 having an upwardly extending tongue 14 also projecting within the coil, to locate and hold the spring in position, the spring thus constituting a yielding coupling between the members. A link 15 connects the member 6 with a crank 16, fixed on the squared end of the handle 17, that extends to the outside of the hood and is mounted in escutcheon plates 18 and 19, welded, brazed, or otherwise secured on opposite sides of the side panel.

The parts are shown in Figs. 2 and 3 in the unlocked position. Rotation of the handle 17 in the direction of the arrow in Fig. 2 moves the parts to the locked position. During approximately the first quarter of the rotation the hook 7 is moved toward the bracket, and after it engages the bracket, further rotation of the handle causes the spring 12 to be placed under compression by the separation of the members 5 and 6, until the point of attachment of the link 15 with the crank passes upper dead center, after which the spring exerts a positive downward pull to lower the link a few degrees beyond dead center. At such time the parts are in the dotted line position shown in Fig. 2, when the stop ear 20 engages with the link to limit further movement. The reverse rotation of the handle 17 returns the parts to the original unlocked position, as will be readily understood, at which time the ear 21 engages the link 15 and serves as a stop.

From the above description it will be apparent that there is provided a fastener having the particular advantages before enumerated as desirable. While the device has been described more or less specifically, it is to be understood that the invention is not limited to the exact details shown, but that such modifications may be made as come within the scope of appended claims.

Having thus described my invention, I claim:

1. In combination, a plate-like member having a hooked portion, an operating element, motion transmitting means therebetween including a member connected with the operating element and having a flat plate-like portion juxtaposed beside said plate-like member, a coiled compression spring located in aligned elongated slots in said members and abutting at opposite ends with the respective members, tongues on the respective members within said slots extending toward each other from opposite ends of the slots for projection into the end coils of the spring to retain the spring in the slots.

2. The structure of claim 1 and a fixed keeper tongue extending through aligned elongated slots in both plate members.

3. In combination, a flat plate-like member having a hooked portion for engagement with a fixed part, a U-shaped element straddling the plate-like member in telescopic relation, with its two legs of flat plate-like formation for sliding contact with the opposite sides of said plate-like member, a coiled compression spring positioned within aligned elongated slots in both legs and said member and abutting the element and member at opposite ends respectively, for transmitting motion therebteween, and operating means associated with said element.

In testimony whereof I affix my signature.

JOHN F. WILSON.